United States Patent [19]

Dillon

[11] 4,290,111
[45] Sep. 15, 1981

[54] DECIBEL ADDITION CIRCUIT

[75] Inventor: Keith Dillon, Worthing, England

[73] Assignee: The Singer Company, Binghamton, N.Y.

[21] Appl. No.: 102,708

[22] Filed: Dec. 12, 1979

[30] Foreign Application Priority Data

Mar. 14, 1979 [GB] United Kingdom ............... 8925/79

[51] Int. Cl.³ ...................... G06F 7/556; G06G 7/24
[52] U.S. Cl. .................................. 364/768; 324/142;
328/145; 364/857
[58] Field of Search ............... 364/768, 857, 807, 483;
328/145, 143, 158; 324/132, 140 R, 142; 179/1
MN, 1 N; 73/646, 647, 648

[56] References Cited

U.S. PATENT DOCUMENTS

| | | | |
|---|---|---|---|
| 3,342,984 | 9/1967 | Gray et al. ..................... | 364/857 X |
| 3,657,528 | 4/1972 | Plante ............................ | 328/145 X |
| 3,792,246 | 2/1974 | Gilbreath et al. .............. | 328/145 X |
| 3,940,603 | 2/1976 | Smith ............................. | 328/145 X |
| 4,000,463 | 12/1976 | Katzmann et al. ............ | 328/145 X |
| 4,011,509 | 3/1977 | Edwards ........................ | 328/145 X |

Primary Examiner—Joseph F. Ruggiero
Attorney, Agent, or Firm—Douglas M. Clarkson; Jeff Rothenberg

[57] ABSTRACT

An addition circuit for adding two decibel measurements received at input terminals 12 and 14, first substracts the inputs in a subtractor circuit 16 to obtain a difference d. Then, based upon the magnitude of the difference d, the addition circuit determines the value of $10 \log [1+10^{d/10}]$ or $20 \log [1+10^{d/20}]$ in a read-only memory circuit 20. A selector circuit 24 determines which of the two input decibel measurements is the larger and controls the complementer circuit 18 so that the value of the difference d is always negative. The output of the read-only memory circuit 20 is added to the larger of the two input in an adder 22.

10 Claims, 1 Drawing Figure

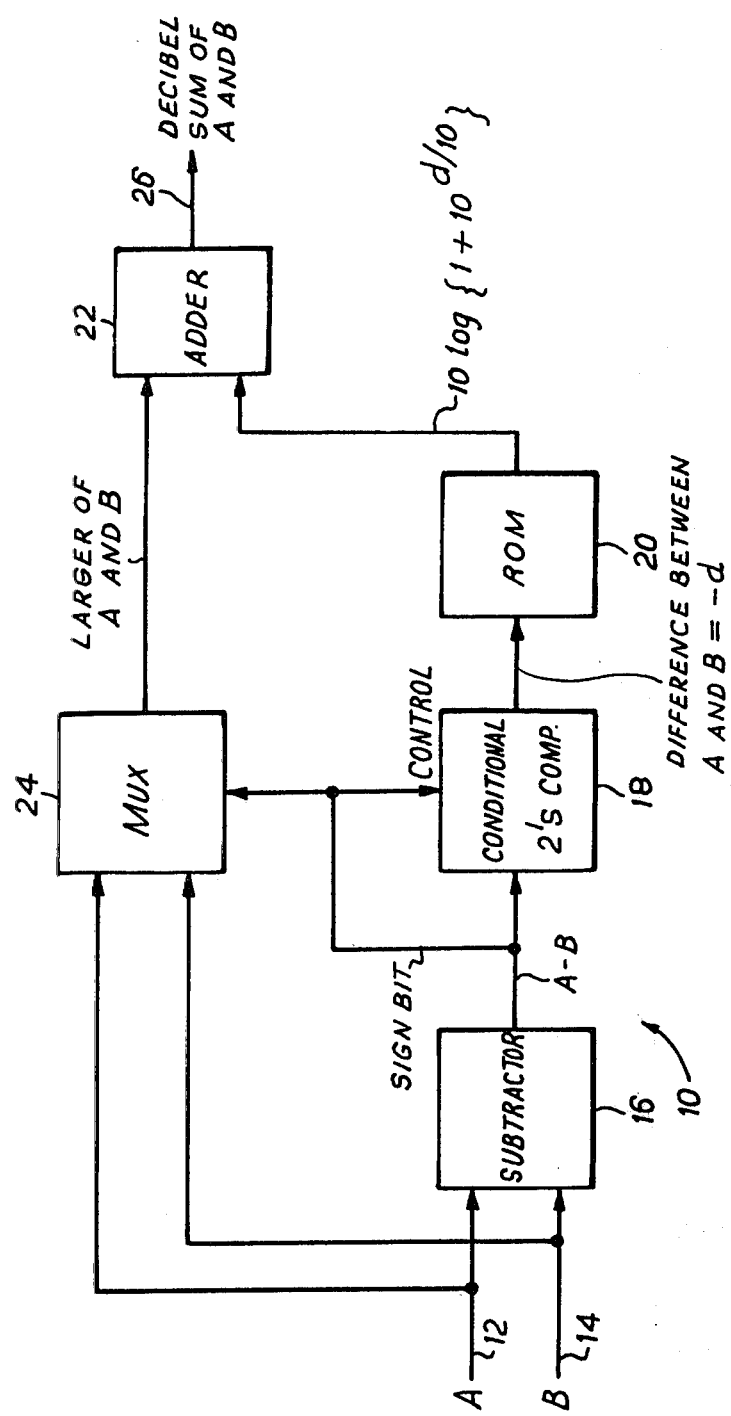

DECIBEL ADDITION CIRCUIT

BACKGROUND OF THE INVENTION

1. Field of the Invention

This invention relates to an addition circuit for adding electrical signals representing two power or voltage values which are expressed in the decibel measurement system.

In the decibel measurement system, a power P is defined in terms of the function $10 \log_{10} P$. A signal voltage V representing this power gives a decibel measurement of $10 \log_{10} V^2$, or $20 \log_{10} V$.

2. The Prior Art

The conventional system for adding two decibel measurements is, first, to convert each measurement back to a power or voltage measurement; then, to add these powers or voltages together, and finally, to convert the resultant total back again into the decibel form of measurement. For this conventional system to be effective, it is necessary to convert both voltage measurements into a linear form of mathematical expression.

In the patented prior art, there is a patent to Edwards, U.S. Pat. No. 4,011,509 which teaches a digital circuit for determining relative power measurements by storing a value representing a first power measurement and using that value as a reference for processing subsequent power measurements. Each value of power measurement is converted into a base 10 logarithm, and a ratio, in decibels, is obtained between each power measurement and the reference value.

Although the present invention utilizes some of the basic circuit component parts as in the Edwards digital circuit for his network analysis, the overall arrangement of the present invention, as well as the objectives of the invention, are totally different. These and other distinctions will become more apparent as the description proceeds.

SUMMARY OF THE INVENTION

In accordance with the present invention, very much simpler circuitry is used, which offers distinct advantages over the above-described conventional system.

It is an important object of the invention, therefore, to provide a new and improved circuit capable of adding two decibel values directly.

According to the invention, first and second input terminals receive, respectively, two signals x and y representing decibel measurements, and a subtractor circuit is connected to the two input terminals to determine the difference $y - x$ therebetween and to provide a difference signal of value d. A logarithmic conversion circuit is connected to the subtractor circuit to develop a signal having the value $10 \log [1 + 10^{d/10}]$, or $20 \log [1 + 10^{d/20}]$, and an adder circuit is connected to the first input terminal and to the output terminal of the logarithmic conversion circuit to provide a signal representing the decibel sum of the two input signals.

It is preferred that the difference d should always be negative, and therefore, means is connected to the input terminals so as to ensure that the larger of the input signals is always selected as the first input and the smaller input signal as the second input. While the logarithmic conversion circuit may take several different forms, in the present embodiment of the invention, it is a read-only memory circuit.

BRIEF DESCRIPTION OF THE DRAWINGS

Other and further objects, advantages and features of the invention will become more apparent from the following detailed description and claims when considered in connection with the accompanying single FIGURE of drawings, which shows an addition circuit in block form and the various interconnections between certain component parts.

THE PREFERRED EMBODIMENT

The invention will now be described in more detail by way of example, with reference to the drawing, in which a circuit 10 is illustrated as having two input terminals 12 and 14 for receiving, respectively, two signals A and B. The signals A and B are applied to a subtractor circuit 16 to generate an A minus B signal, which can be positive or negative depending on which of A and B is the larger. This difference signal is applied to a controlled or conditional 2-complementer circuit 18.

The sign bit from the subtractor circuit 16 is applied to the control input terminal of the circuit 18 and is arranged so that when an output from the subtractor circuit 16 is taken, the signal value is complemented. In other words, the 2-complementer circuit 18 provides the modulus $|A-B|$ of the output from the subtractor circuit 16.

The signal from the 2-complementer circuit 18 is applied to a read-only memory circuit 20 which serves as a look-up table to provide, for an input of $-d$, an output of $10 \log [1 + 10^{d/10}]$. This signal is applied to one input terminal of an adder circuit 22.

The signal bit from the subtractor circuit 16 is applied also to a multiplexer circuit 24 which operates as a selector switch. In accordance with the sign of the output from the subtractor circuit 16, the multiplexer circuit 24 selects the larger of the two signals A and B and applies it to the other input terminal of the adder circuit 22. The output terminal 26 of the adder circuit 22, therefore, represents the decibel sum of the two input signals A and B.

The measurement of a power P in decibels is defined as $10 \log_{10} P$. Therefore, if two decibel measurements x and y of powers $P_1$ and $P_2$ in watts are available, the following obtains:

$$x = 10 \log P_1 \tag{1}$$

$$y = 10 \log P_2 \tag{2}$$

The required sum of the two powers is given by $10 \log (P_1 + P_2)$, which is expressed as follows:

$$z = x + c = 10 \log (P_1 + P_2) \tag{3}$$

From this, the following is derived:

$$c = 10 \log (P_1 + P_2) - 10 \log P_1$$

Therefore, $$c = 10 \log [1 + (P_2/P_1)] \tag{4}$$

Subtracting equations (1) and (2) produces:

$$y - x = 10 \log P_2 - 10 \log P_1$$

$$= 10 \log \left[ \frac{P_2}{P_1} \right].$$

Hence:

$$10^{(y-x)/10} = \frac{P_2}{P_1} \quad (5)$$

Thus, equation (4) becomes:

$$c = 10 \log [1 + 10^{(y-x)/10}]$$

and equation (3) becomes:

$$z = x + 10 \log [1 + 10^{(y-x)/10}] \quad (6)$$

In choosing x and y for the above equations from the two input signals, it is preferred for x to be the larger number. In this way, the expression $(y-x)/10$ will never be greater than zero, which simplifies the storage requirement considerably. In this case:

$$0 \leq 10 \log [1 + 10^{(y-x)/10}] \leq 3.01.$$

This defines the capacity of the ROM circuit 20 in the drawing.

The multiplexer circuit 24 and the 2-complementer circuit 18 will operate to ensure that:

x is the larger of A and B
y is the smaller of A and B
y−x is the difference A−B.

When voltages $V_1$ and $V_2$ rather than powers are considered, then the relationship is:

$$x = 10 \log V_1^2 = 20 \log V_1 \quad (7)$$

and $$y = 10 \log V_2^2 = 20 \log V_2 \quad (8)$$

From these equations, the following exists:

$$y - x = 20 (\log V_2 - V_1) = 20 \log \frac{V_2}{V_1} \quad (9)$$

so that:

$$\frac{V_2}{V_1} \ 10^{(y-x)/20}$$

The required output signal is:

$$z = 10 \log (V_1 + V_2)^2 = 20 \log (V_1 + V_2)$$

This can be written:

$$z = 20 \log V_1 - 20 \log V_1 + 20 \log (V_1 + V_2)$$

Combining the last two terms:

$$z = 20 \log V_1 + 20 \log \left[ 1 + \frac{V_2}{V_1} \right] \quad (10)$$

Substituting from (7) and (9):

$$z = x + 20 \log [1 + 10^{(y-x)/20}] \quad (11)$$

When the difference between A and B exceeds a predetermined value, the output of the ROM circuit 20 will always be zero. This defines the accuracy of the system.

It will be seen that the above-described decibel addition circuit operates by taking the larger of the two input signals and determines the amount which must be added to this larger signal to produce the required sum signal. Such additional amount is derived from the difference between the two input signals. It is unnecessary, therefore, to convert the two input signals, first, into a linear form of mathematical expression, which reduces the complexity of the equipment while allowing improved accuracy.

Although it is preferred to apply the larger of the two input signals directly to the adder circuit 16, this is not essential if the capacity of the ROM circuit 20 is increased. If one input signal is known to be always larger than the other, then the selection circuit 18 and 24 for selecting the larger signal can be omitted.

The principles of the invention have been described hereinabove in connection with a specific circuit and specific interconnections of component parts; it is to be clearly understood, however, that this description is made only by way of illustration and example and not as limiting the scope of the invention, the scope of the invention being defined by the appended claims.

What is claimed is:

1. A decibel addition circuit for adding two signals in the decibel form of measurement directly, comprising:
    means for determining which of said two signals is the larger,
    means for determining the difference in magnitude between said two signals,
    means responsive to said difference in magnitude for generating a signal having a value of 10 log $[1 + 10^{d/10}]$, and
    means for adding said signal generated by said last-mentioned means to the larger of said two signals determined by said first-mentioned means for providing the decibel sum of said two decibel signals.

2. A decibel addition circuit according to claim 1 wherein said means for determining the difference in magnitude between said two signals includes subtractor circuit means.

3. A decibel addition circuit according to claim 1 wherein said means responsive to said difference in magnitude includes a read-only memory circuit.

4. A decibel addition circuit according to claim 1 wherein said means for adding includes an adder circuit means.

5. A decibel addition circuit according to claim 2 including selector circuit means connected with said means for determining the difference in magnitude between said two signals for selecting the larger of said two signals, so that the smaller signal is subtracted from the larger signal.

6. A decibel addition circuit according to claim 2 including complementer circuit means connected to said subtractor circuit means, and selector circuit means to determine which of the two signals is the larger and connected to control said complementer circuit means, so that the value of said difference is a predetermined sign.

7. A decibel addition circuit according to claim 1 wherein said means for determining which of said two signals is the larger includes multiplexer circuit means.

8. A decibel addition circuit according to claim 1 wherein said means responsive to said difference in magnitude includes logarithmic conversion circuit means.

9. A decibel addition circuit according to claim 8 wherein said logarithmic conversion means comprises a read-only memory circuit.

10. A decibel addition circuit according to claim 5 including complementer circuit means connected between said subtractor circuit means and said read-only memory circuit means to develop the modulus of the output from the subtractor circuit means.

* * * * *